Aug. 16, 1960     C. F. SAWYER, JR     2,948,957
MANUFACTURE OF METAL STOCK HAVING INTERNAL HOLES
Filed March 26, 1956
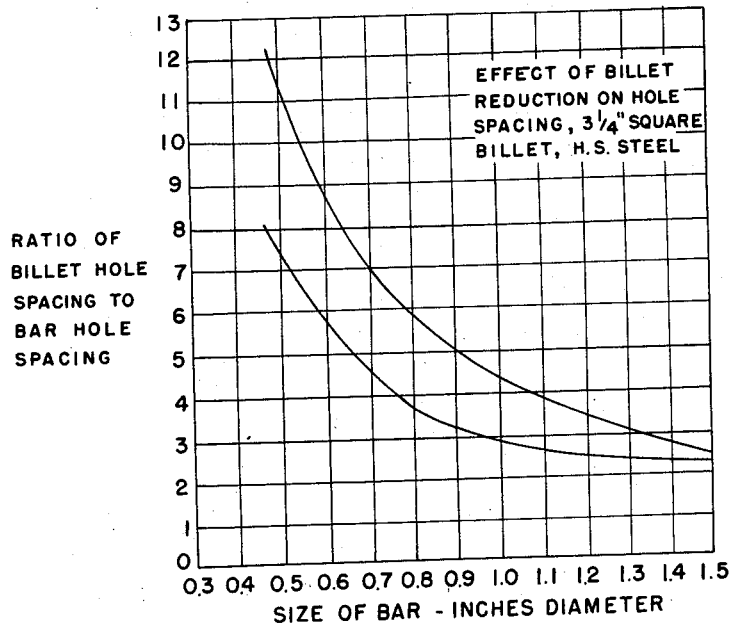
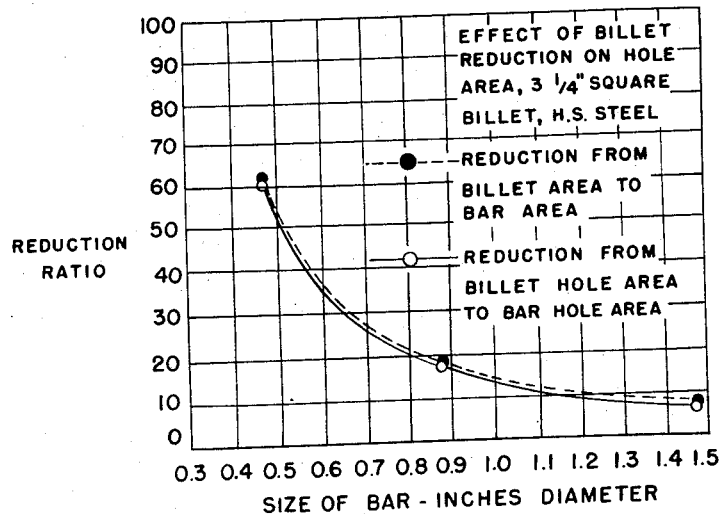
INVENTOR:
CHARLES F. SAWYER, JR.
BY
ATT'YS

United States Patent Office 2,948,957
Patented Aug. 16, 1960

2,948,957

MANUFACTURE OF METAL STOCK HAVING INTERNAL HOLES

Charles F. Sawyer, Jr., Latrobe, Pa., assignor to Vanadium-Alloys Steel Company, Latrobe, Pa., a corporation of Pennsylvania Filed Mar. 26, 1956, Ser. No. 573,964

1 Claim. (Cl. 29—423)

This invention relates to the manufacture of metal stock having one or more internal holes, particularly oil hole bar stock. The invention provides a new method or process of providing the oil hole or holes in, especially, drill bar stock.

Oil hole drills in the past have been made by various methods, all involving the use of bar stock of a size roughly that of the finished drill. The most popular and satisfactory method has been to drill two holes, of a size and location desired, in the bar stock, twist this so that the drilled holes have the same helical path through the bar as the helical flutes of the finished drill, and finally to machine the flutes and perform other machining necessary to the proper drill form. Some oil hole drills have been made by brazing and welding tubes into the machined drill flute. Another method has been to groove the bar and roll over the edges of each groove to form two holes, after which the oil hole drill is made in the same manner as though the hole had been drilled through the bar.

All of these methods involve using bar stock of roughly the same dimensions in length and diameter as the finished drill. These foregoing methods are costly, e.g., they involve drilling deep holes of a small diameter, and this drilling, especially in the smaller sizes of oil hole drills, is quite hazardous because of the chance of the drills breaking or the final holes having excessive run-out.

It is therefore an object of the invention to provide a method of manufacutring metal stock having an internal hole which overcomes the prior disadvantages.

A more particular object is to provide a method which is rapid, reliable, safe, simple and economical.

A further object is to provide a method for providing stock having internal holes which are accurately located and dimentioned.

Another object is to provide metal stock having oil holes therein, in lengths hitherto impractical.

An additional object is to provide a method wherein holes are provided in billets or the like and are preserved in the bar stock produced therefrom.

Another object is to provide bar stock having an internal hole, which greatly simplifies the machine work necessary and reduces manufacturing operations to the minimum.

A further object is to provide a method which results in reduced rejects and eliminates hazards of manufacturing.

An additional object is to provide a method for producing small holes in bar stock which, however, requires only that relatively large holes be drilled in relatively large billets, with accompanying simplicity and reliability of operation. These and other objects of the invention will be apparent on consideration of the specification and the attached drawings, which are graphic representations of the relationships obtained in the invention.

The invention provides a method of manufacturing metal stock having an internal hole which involves providing a hole in a billet, supporting the hole walls against change in form, reducing the billet to form and size, and clearing the hole. Thereafter, the resulting stock may be twisted to provide the proper helix and the drill finish machined.

The new method is especially advantageous for manufacturing oil hole drill bar stock, generally having two internal holes which are carefully spaced and sized. A billet is provided with holes of predetermined area and spacing, on the basis of the relationships found to exist in the invention, and the billet is mechanically reduced to bar stock of size approximately that of the finished drill and having the desired holes.

In the invention, billets or like semifinished products are drilled, and the billets are worked to produce bar stock with the necessary holes in it, allowing the drill manufacturer to cut the length for his oil hole drills, twist this length so the holes have the proper helix, and finish machine the drill. This bar stock with the holes in it greatly simplifies the machine work necessary for machining oil hole drills. In addition, this oil hole drill bar stock may be rolled or extruded in lengths of many multiples of the finished oil hole drill length.

The invention is applicable to the manufacture of various types of drilled shaped metal sections, especially bar stock, from iron, steel, and alloy billets. Particularly advantageous application is found in the manufacture of tool steel stock, especially high speed steel bar stock, from the various ferrous alloys used for that purpose.

To keep the holes drilled in the billet from collapsing during the rolling or extruding operation, rigid deformable and removable cores such as metal rods are inserted in the drilled holes. The rods preferably have about the same diameter as the holes. These rods advantageously may be made of any one of several alloys having properties of compressibility and deformability similar to the billet. Alloys of copper or austenitic steels are more preferable for this purpose. The copper alloys may be removed from the holes in the rolled or extruded bar by heating the bar above the melting point of the copper alloy, and allowing the melted copper alloy to flow out of the holes. The austenitic alloys, such as Stainless 304 or Hadfield Manganese Steel, have sufficient ductility and strength to allow the rods to be pulled from the holes, e.g., on a draw bench.

To keep the rods made from austenitic material from welding into the holes during the rolling or extruding operation, an infusible coating material is placed on the rods before they are inserted into the holes in the billet. There are many relatively inert materials that may be used for this coating. A preferred coating for this purpose may be made from 600 grit aluminum oxide powder, mixed to a paste with sodium silicate, and painted on the rods before the rods are inserted into the drilled holes in the billet.

To produce the bar stock with two longitudinal holes in it, a billet of a convenient size, for example, 3¼" square and 12" long, is taken, two cylindrical holes are drilled in this billet at the predetermined proper locations and of the predetermined proper diameter, cylindrical metal rods are placed in these holes, and this billet is hot worked by rolling or extrusion into a bar by the usual techniques employed by all manufacturers of hot rolled or extruded bar stock. The coated rods preferably have a slightly smaller diameter than the holes, the decrease in diameter being within about 5%. This permits insertion of the coated rods while preserving the coating. The meltable rods require substantially no clearance. The location of the two holes drilled in the billet and the area of these holes bear relationships to the location and area of the holes in the rolled or extruded bar, as will appear.

It will be resognized that these holes drilled in the billet are large and easily drilled, in contrast to the difficulty and expense of drilling small holes in the finished bar, which is greatly reduced in area.

In the accompanying drawings:

Figure 1 is a graph showing the effect of billet reduction on hole spacing; and

Figure 2 is a graph showing the effect of billet reduction on hole area.

The graph of Figure 1 of the drawings shows, as an example, how the location of the holes in the mechanically shaped bar relates to the location of the holes drilled in the original billet from which the bar is reduced to form and size. The ratio of hole spacing for the several bar sizes will be within the range included between the two curves, e.g., in rolling or extruding a 0.9" diameter oil hole drill bar, the spacing of the holes in the billet will be from 3.25 to 5 times the spacing of the holes in the rolled or extruded bar. From the graph, it is evident that the greater the reduction from mechanical working by rolling or extruding, the greater the variation in the location of the holes in the rolled bar. The ratio of hole spacing is thus graphically relatable to the degree of reduction. The location of the holes in the rolled or extruded bar in this manner may be placed in close approximation to the spacing and placement of the holes that the various manufacturers of oil hole drills may specify. Likewise, similar graphs can be plotted for other reductions. This graph is given as an example and is not intended in any way to limit the invention, since different billet sizes in relation to finished bar sizes will alter the relationship shown to some extent, which is easily determined on the basis of the principles illustrated by those versed in the art of rolling or extruding steel or other alloy bars.

It is also found that the area of the holes in the rolled or extruded bar bears the same relationship to the area of the holes in the billet, as the cross-sectional area of the rolled bar bears to the cross-sectional area of the billet. This will be seen on reference to Figure 2 of the drawings, where the reduction ratio of the cross-sectional area of each hole from billet to bar is compared with that of the cross-sectional area of the work. As an example, the reduction in area of the work from a 3¼" square billet to a 0.9" diameter bar is 16.6:1. From the graph, it is seen that the ratio of billet hole area to bar hole area is approximately the same, or slightly less.

The straightness of the holes is preserved in the bar stock. Thus, the holes in a 10 to 12 foot bar rolled or extruded from a billet 10 inches long are straight within three degrees of twist.

The following examples further illustrate the invention, but it will be understood that the billet size, the characteristics of the holes drilled in the billet, and the other conditions and procedures are not limited by these or the preceding examples given, which are only illustrative of the invention.

*Example 1*

In making an oil hole drill bar by the rolling process, a 3¼" square billet of high speed steel, 10" long, with chemical analysis which may be carbon .87%, silicon .30%, manganese .20%, sulphur .01%, phosphorus 0.1%, chromium 4.00%, vanadium 1.95%, molybdenum 8.25%, is drilled longitudinally with two holes equidistant from the center on the diagonal of the billet. The holes are drilled .547" diameter, 1.75" center to center, making a hole spacing of 1.203". Two rods, .530" diameter, 10" long of an autenitic material, such as 304 Stainless Steel, are coated with an inert material, such as 600 mesh Aluminum Powder mixed to a paste with sodium silicate or water and inserted into the two holes in the billet.

The rods are allowed to dry in the billet for several days, following which the billet is heated to about 2000° F. and rolled in a conventional rolling mill to a ⅞" diameter bar, about 12' long. This rolled bar is air cooled following rolling. The cooled bar is nicked about 4" from one end and the end is broken off, care being taken not to break the two rods which are left to protrude from the end of the bar.

The bar is then placed in a draw bench, held tightly, and the protruding ends of the two bars are gripped by the movable jaws of the draw bench. Pulling is started slowly and steadily, and the rods are withdrawn from the bar, leaving two holes the full length of the bar. The holes are straight within about 3 degrees of twist in 10 to 12 feet and are spaced about .260" apart. Following this operation, the bar is annealed to a Brinell hardness of 207 to 241, and may be cut in any multiple lengths desired.

*Example 2*

In making an oil hole drill bar by the extrusion process, a 4" diameter round billet, 12" long, of the high speed steel of Example 1 is drilled with two holes on a diameter equidistant from the center. The holes are drilled .641" diameter, 1.938" center to center, making the hole spacing 1.297". Austenitic rods .625" diameter by 12" long are coated and inserted in the holes as in Example 1. The billet is then heated and extruded into a bar of ⅞" diameter, and air cooled.

The extrusion lubricant is removed from the bar, and the bar is then handled exactly the same as the rolled bar in Example 1 to prepare the multiple lengths for oil hole drills. The hole spacing in this extruded bar is about .260", the same as the hole spacing in the rolled bar.

Alternatively, rods can be inserted in the billet holes which are made from a meltable copper alloy containing 90% copper, 10% zinc, or 95% copper, 5% tin for example. After rolling or extrusion at 1750° F., the bar is heated to 2000° F. The alloy melts and is allowed to flow out of the hole. The bar is then air cooled and finished in the same manner.

The invention thus provides a method for producing drilled metal stock having one or more longitudinal holes, the holes being suitably spaced and dimensioned for, especiall, the manufacture of oil hole drills from the stock. The invention is characterized by extreme simplicity and reliability of operation, constituting a considerable improvement over the prior methods. Particularly, the expense and troubles associated with providing deep holes of small diameter in bar stock have been greatly reduced.

The invention is hereby claimed as follows:

The method of manufacturing oil hole drill bar stock having suitably spaced and dimensioned holes which comprises graphically relating to the degree of reduction the ratio of distance between billet holes to distance between bar stock holes for a billet mechanically reduced to bar stock, drilling holes in a billet spaced apart a distance corresponding to said graphical relationship for the hole spacing required in bar stock of size approximately of the finished drill, the ratio of the area of said drilled holes to the required area of the holes in said bar stock approximately equalling the ratio of the cross-sectional area of said billet to that of said bar stock, inserting a core in each hole supporting the hole walls against change in form, mechanically reducing the billet to bar stock of size approximately that of the finished drill, and removing the cores.

References Cited in the file of this patent

UNITED STATES PATENTS

| | | |
|---|---|---|
| 2,021,945 | Payne | Nov. 26, 1935 |
| 2,093,722 | Colwell | Sept. 21, 1937 |
| 2,300,353 | Eberhardt | Oct. 27, 1942 |
| 2,541,849 | Villeneuve | Feb. 13, 1951 |
| 2,628,417 | Peyches | Feb. 17, 1953 |
| 2,669,008 | Levi | Feb. 16, 1954 |

UNITED STATES PATENT OFFICE

CERTIFICATE OF CORRECTION

Patent No. 2,948,957                                                    August 16, 1960

Charles F. Sawyer, Jr.

It is hereby certified that error appears in the printed specification of the above numbered patent requiring correction and that the said Letters Patent should read as corrected below.

Column 3, line 3, for "resognized" read -- recognized --; line 71, for "autenitic" read -- austenitic --; column 4, line 43, for "especiall" read -- especially --; line 72, list of references cited, for "2,093,722" read -- 2,093,772 --.

Signed and sealed this 11th day of April 1961.

(SEAL)
Attest:
ERNEST W. SWIDER
Attesting Officer

ARTHUR W. CROCKER
                                                                 Acting Commissioner of Patents